(12) United States Patent
Lee et al.

(10) Patent No.: US 12,334,601 B2
(45) Date of Patent: Jun. 17, 2025

(54) BATTERY CELL, ELECTROLYTE INJECTION APPARATUS FOR BATTERY CELL, AND ELECTROLYTE INJECTION METHOD USING THE SAME

(71) Applicant: SK On Co., Ltd., Seoul (KR)

(72) Inventors: Jong Hyuk Lee, Daejeon (KR); Hee Gyoung Kang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/559,188

(22) Filed: Dec. 22, 2021

(65) Prior Publication Data

US 2022/0200112 A1 Jun. 23, 2022

(30) Foreign Application Priority Data

Dec. 22, 2020 (KR) .................. 10-2020-0181313

(51) Int. Cl.
*H01M 50/636* (2021.01)

(52) U.S. Cl.
CPC ...... *H01M 50/636* (2021.01); *H01M 2220/20* (2013.01)

(58) Field of Classification Search
CPC . H01M 10/44–445; H01M 50/10–105; H01M 50/162; H01M 50/167; H01M 50/171; H01M 50/30; H01M 50/317; H01M 50/325; H01M 50/35; H01M 50/358; H01M 50/367; H01M 50/60–645; H01M 50/627; H01M 50/636; H01M 50/664; H01M 50/668; H01M 50/3425; H01M 2200/20; H01M 50/527; H01M 50/186; H01M 50/618; H01M 50/202; H01M 10/052; H01M 10/0525; H01M 10/058; H01M 10/4214; H01M 10/12; H01M 50/55; H01M 50/308; H01M 10/647; H01M 10/10; H01M 50/211; H01M 50/609–682; H01M 2220/20; Y02E 60/10; Y02E 10/50;

(Continued)

(56) References Cited

U.S. PATENT DOCUMENTS 3,867,201 A * 2/1975 Holmes .................. H01M 6/32
429/185
2002/0177819 A1* 11/2002 Barker ................ A61M 5/3234
604/232

(Continued)

FOREIGN PATENT DOCUMENTS

CN 205846104 U * 12/2016
DE 102012212463 A * 1/2014

(Continued)

OTHER PUBLICATIONS

KR-20130000364-A—Machine Translation to English (Year: 2013).*

(Continued)

*Primary Examiner* — Allison Bourke
*Assistant Examiner* — Bethany C Garcia
(74) *Attorney, Agent, or Firm* — IP & T GROUP LLP

(57) ABSTRACT

A battery cell includes a case, accommodating an electrode assembly therein, and a connection unit formed to have a tube shape and having one end bonded to an external surface of the case. The case includes a projection formed to protrude outwardly, and the projection is disposed in an internal surface of the connection unit.

19 Claims, 11 Drawing Sheets

(58) Field of Classification Search
CPC ..... Y02E 10/72; Y02E 60/13; Y10T 29/4911; Y10T 29/49108; Y10T 29/53135; Y10T 156/10; Y02P 70/50; B65D 51/002; A61J 1/2065; A61M 5/46
See application file for complete search history.

(56) References Cited

U.S. PATENT DOCUMENTS

| | | | | |
|---|---|---|---|---|
| 2003/0144633 | A1* | 7/2003 | Kirchhofer | A61M 5/2033 604/201 |
| 2008/0070101 | A1* | 3/2008 | Barrella | H01M 50/645 429/185 |
| 2009/0233150 | A1* | 9/2009 | Takahashi | H01M 8/04216 239/584 |
| 2011/0300437 | A1* | 12/2011 | Yi | H01M 50/645 429/185 |
| 2013/0017437 | A1* | 1/2013 | Ahn | H01M 50/627 29/623.2 |
| 2016/0020452 | A1 | 1/2016 | Choi et al. | |
| 2018/0175364 | A1* | 6/2018 | Hong | H01M 50/609 |
| 2018/0366718 | A1 | 12/2018 | Yoon et al. | |
| 2020/0127248 | A1 | 4/2020 | Kim et al. | |

FOREIGN PATENT DOCUMENTS

| | | | |
|---|---|---|---|
| JP | H04345755 A | * 12/1992 | ............. Y02E 60/12 |
| KR | 10-2011-0132856 A | 12/2011 | |
| KR | 20130000364 A | * 1/2013 | |
| KR | 10-1379691 B1 | 4/2014 | |
| KR | 10-1508400 B1 | 4/2015 | |
| KR | 10-2016-0010823 A | 1/2016 | |
| KR | 10-2016-0051444 A | 5/2016 | |
| KR | 10-2018-0023706 A | 3/2018 | |
| KR | 10-2038562 B1 | 10/2019 | |

OTHER PUBLICATIONS

CN-205846104-U—Machine Translation to English (Year: 2016).*
DE-102012212463-A—Machine Translation to English (Year: 2014).*
JP H04345755 A—English Translation via Espacenet, Accessed Oct. 7, 2024 (Year: 2024).*
Office Action for Korean Patent Application No. 10-2020-0181313 issued by the Korean Patent Office on May 2, 2025.

* cited by examiner

I-I'

BATTERY CELL, ELECTROLYTE INJECTION APPARATUS FOR BATTERY CELL, AND ELECTROLYTE INJECTION METHOD USING THE SAME

CROSS-REFERENCE TO RELATED APPLICATION(S)

The present application claims the benefit of priority to Korean Patent Application No. 10-2020-0181313, filed on Dec. 22, 2020 in the Korean Intellectual Property Office, the entire disclosure of which is incorporated herein by reference.

BACKGROUND

1. Field

The present disclosure relates to a battery cell, an electrolyte injection apparatus for a battery cell, and an electrolyte injection method using the same.

2. Description of Related Art

Secondary batteries, unlike primary batteries, may be electrically charged and discharged, and thus, may be applied to devices within various fields such as digital cameras, mobile phones, laptop computers, and hybrid vehicles. Examples of the secondary battery include a nickel-cadmium battery, a nickel-metal hydride battery, a nickel-hydrogen battery, a lithium secondary battery, and the like.

In general, such secondary battery is formed by stacking a cathode, a separator, and an anode. Materials of the cathode, the separator, and the anode are selected in consideration of lifespan, charge and discharge capacity, temperature characteristics, and stability of the battery.

Secondary batteries are classified into pouch type, can type, and other types, depending on a material of a case accommodating an electrode assembly. The pouch-type secondary battery accommodates an electrode assembly in a pouch formed of a flexible polymer material having a non-uniform shape. The can-type secondary battery accommodates an electrode assembly in a case formed of a material such as metal or plastic having a uniform shape.

Among such secondary batteries, a lithium secondary battery having high energy density and discharging voltage has mainly been researched. Recently, a lithium secondary battery has mainly been used in the form of a module in which a plurality of flexible pouch-type battery cells are connected.

In a pouch-type lithium battery cell, a passage to the outside is completely blocked at the end stage of manufacturing the battery cell to prevent the introduction of water and air. This is a significantly useful method in terms of the long-term lifespan of the battery cell, but is a factor in preventing the discharge of gas, generated by deterioration of the battery cell, or the replenishment of an electrolyte.

SUMMARY

An aspect of the present disclosure is to provide a battery cell, capable of discharging gas generated inside a battery cell and replenishing an electrolyte, an electrolyte injection apparatus coupled to a specific portion of a battery cell to discharge gas and replenish an electrolyte, and an electrolyte injection method using the electrolyte injection apparatus.

According to an aspect of the present disclosure, a battery cell includes: a case accommodating an electrode assembly therein; and a connection unit formed to have a tube shape and having one end bonded to an external surface of the case. The case includes a projection formed to protrude outwardly, and the projection is disposed in an internal surface of the connection unit.

The connection unit may include: a body portion; and a coupling portion disposed on an end portion of the body portion, bonded to the case and accommodating the projection therein.

The coupling portion may be formed to have an external diameter greater than or equal to an external diameter of the body portion.

An insertion blocking portion formed on the body portion of the connection unit for limiting a depth to which an injection needle is inserted.

The insertion blocking portion may be formed to have a step or projection shape.

The connection unit may be disposed within a range of thickness of the case.

The connection unit may be bonded to the external surface of the case by thermal fusion, ultrasonic fusion, or bonding using an adhesive.

The connection unit may be formed of a thermoplastic resin.

The connection unit may contain inorganic particles.

A gas barrier may be disposed on a surface of the connection unit.

According to another aspect of the present disclosure, an electrolyte injection apparatus is coupled to a connection unit, formed to have a tube shape and having one end receiving a projection, formed to protrude from an external surface of a case of a battery cell, and bonded to the case, to supply an electrolyte to an inside of the battery cell. The electrolyte injection apparatus includes: an electrolyte containing portion containing an electrolyte therein; an injection needle connected to the electrolyte containing portion; and a sealing cover formed to have a tube shape and coupled to the electrolyte containing portion to be concentric with respect to the injection needle.

The connection unit may be disposed to be inserted into the sealing cover when the electrolyte injection apparatus is coupled to the connection unit, and a sealing member may be provided on an internal circumferential surface of the sealing cover to seal a gap between the sealing cover and the connection unit.

A locking groove, into which a portion of the sealing member is inserted, may be formed in an external circumferential surface of the connection unit.

An end of the injection needle may penetrate through the projection to be disposed in an internal space of the projection when the electrolyte injection apparatus and the connection unit are completely coupled to each other.

An insertion blocking portion may be formed on an external circumferential surface of the connection unit to limit a depth to which the injection needle is inserted.

According to another aspect of the present disclosure, an electrolyte injection method is an electrolyte injection method using the above-described electrolyte injection apparatus. The electrolyte injection method includes: forming an opening in the connection unit; coupling the electrolyte injection apparatus to the connection unit to insert the injection needle into an internal space of the projection; injecting an electrolyte into the battery cell; removing the electrolyte injection apparatus from the connection unit; and sealing the opening of the connection unit.

The sealing of the opening may include thermally compressing or ultrasonically fusing the opening of the connection unit to be sealed.

The sealing of the opening may include filling the opening of the connection unit with a sealing material to seal the opening.

According to another aspect of the present disclosure, disclosed is a system for supplying an electrolyte to a battery cell, having an electrode assembly enclosed inside a case, the system including: a battery cell having an electrode assembly enclosed inside a case, the case having a convex projection protruding from a side surface of the case, a connection unit having a first end bonded to the side surface of the case around the convex projection extending inside a space of the connection unit, and an electrolyte injection apparatus.

The electrolyte injection apparatus may include an electrolyte containing portion containing an electrolyte therein, an injection needle fluidly connected to the electrolyte containing portion, and a sealing cover formed to have a tube shape and coupled to the electrolyte containing portion to be concentric with respect to the injection needle.

The connection unit and the sealing cover may be configured to be sealingly coupled to each other with the injection needle piercing through the convex projection to create a fluid path for the electrolyte from the electrolyte containing portion to be injected into an inside of the case of the battery cell.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
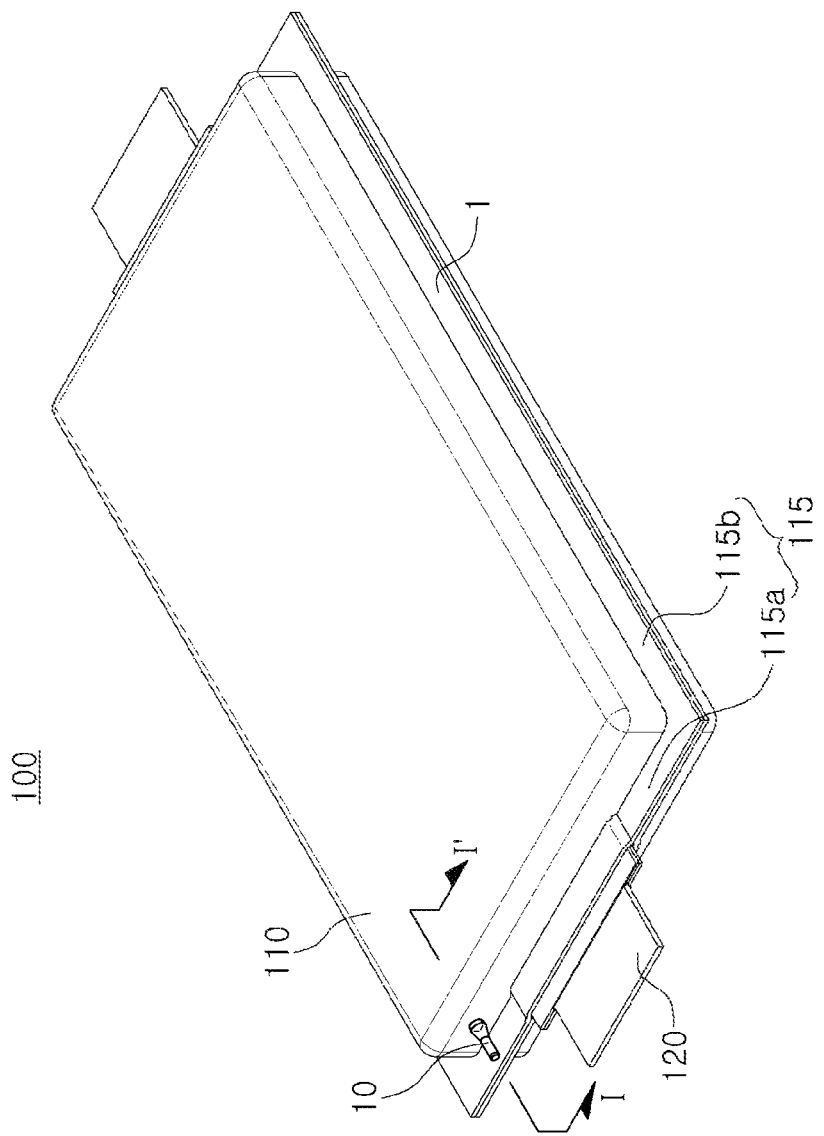
FIG. 1 is a schematic perspective view of a pouch-type battery cell according to an example embodiment of the present disclosure.

It is to be understood that the terms or words used in this description and the following claims must not be construed to have meanings which are general or may be found in a dictionary. Therefore, considering the notion that an inventor may most properly define the concepts of the terms or words to best explain his or her invention, the terms or words must be understood as having meanings or concepts that conform to the technical spirit of the present disclosure. Also, since the example embodiments set forth herein and the configurations illustrated in the drawings are nothing but a mere example and are not representative of all technical spirits of the present disclosure, it is to be understood that various equivalents and modifications may replace the example embodiments and configurations at the time of the present application.

In the drawings, same elements will be indicated by same reference numerals. Also, redundant descriptions and detailed descriptions of known functions and elements that may unnecessarily make the gist of the present disclosure obscure will be omitted. In the accompanying drawings, some elements may be exaggerated, omitted or briefly illustrated, and the sizes of the elements do not necessarily reflect the actual sizes of these elements.

For example, in example embodiments, the terms "upper side," "upper portion," "lower side," "lower portion," and the like, are described with reference to the drawings, and when a direction of a corresponding element changes, the terms may be expressed differently.

Example embodiments may provide a connection unit (10 of FIG. 6), fastened to a battery cell, and an electrolyte injection apparatus (20 of FIG. 6) coupled to the connection unit to supply an electrolyte. The connection unit will be described first.

Figure 2:
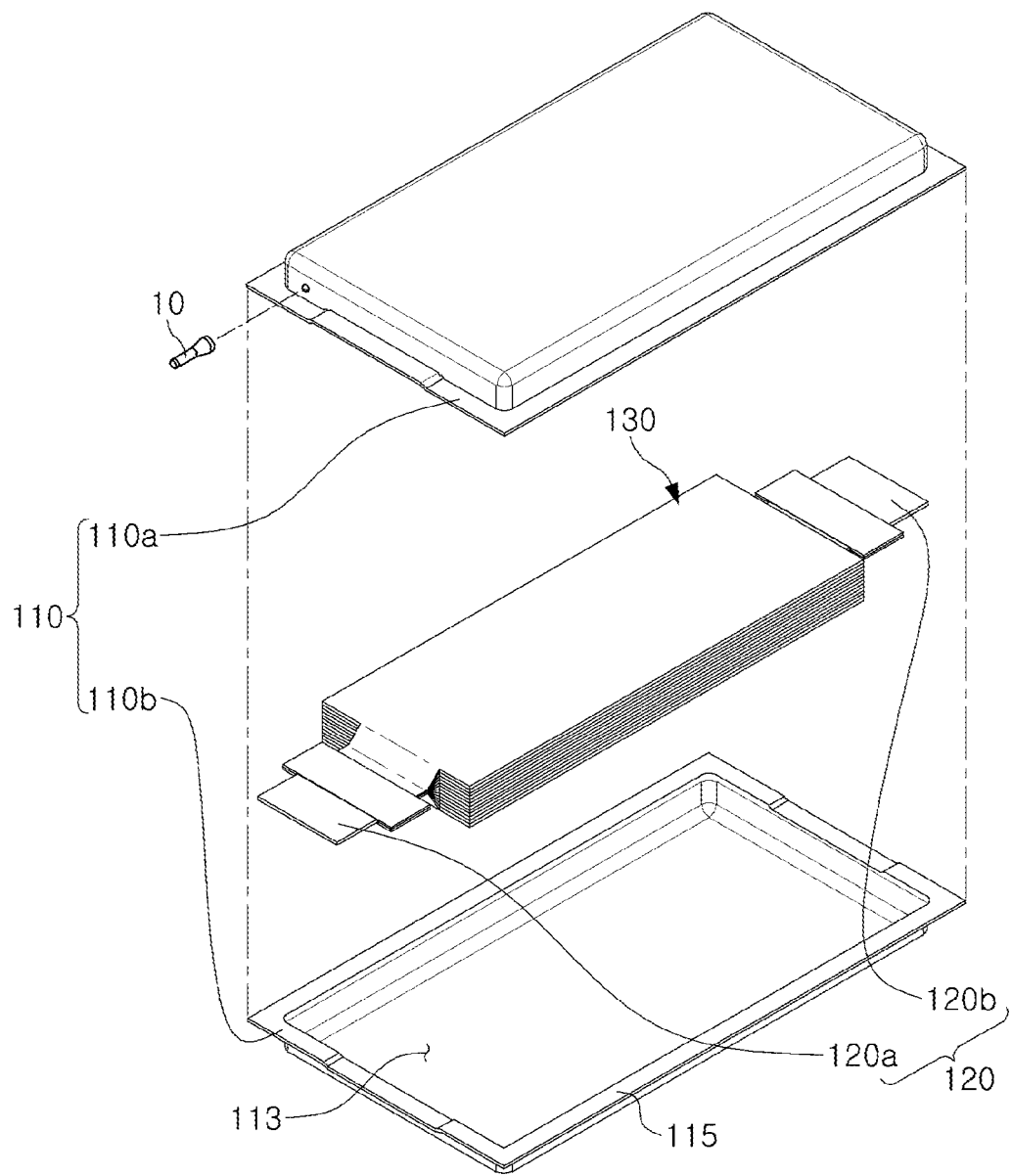
FIG. 2 is an exploded perspective view of the battery cell illustrated in FIG. 1.

FIG. 1 is a schematic perspective view of a pouch-type battery cell according to an example embodiment, and FIG. 2 is an exploded perspective view of the battery cell illustrated in FIG. 1.

Referring to FIGS. 1 and 2, the battery cell 100 according to the present embodiment may include an electrode assembly 130, a battery case 110 accommodating the electrode assembly 130, and a connection unit 10 coupled to the battery case 110.

The battery cell 100 is a rechargeable secondary battery, and may include, for example, a lithium ion (Li-ion) battery or a nickel metal hydride (Ni-MH) battery. A nickel metal hydride secondary battery is a secondary battery in which nickel is used as an anode material, a hydrogen storage alloy is used as a cathode material, and an alkali aqueous solution is used as electrolyte. The nickel metal hydride secondary battery has high capacity per unit volume, and thus, may be used as an energy source for electric vehicle (EV) or a hybrid electric vehicle (HEV) and may also be used in various fields such as energy storage.

The battery cell 100 may have a pouch-type structure, but example embodiments are not limited thereto. For example, the battery cell 100 may have a prismatic structure. In the present embodiment, a description will be provided for the case 110 in which the battery cell 100 is configured in a pouch-type structure.

The cell case 110 may be formed, for example, by performing an insulation treatment on a surface of a metal layer formed of aluminum. In the insulation treatment, modified polypropylene, such as cast polypropylene (CPP), a polymer resin, may be applied while forming a thermal fusion layer, and a resin material such as nylon or polyethylene terephthalate (PET) may be formed on an external side surface thereof.

The battery case 110 may have an accommodation space 113 provided therein. The electrode assembly 130 may be accommodated in the accommodation space 113 of the battery case 110. In addition, an electrode lead 120 may be disposed to protrude outwardly of the battery case 110.

The electrode assembly 130 may be accommodated, together with an electrolyte, in the accommodation space 113 of the battery case 110. The battery case 110 may be completed by coupling a lower case 110b and an upper case 110a to each other and then bonding edges, on which the lower case 110b and the upper case 110a come into contact with each other, to seal the accommodation space 113. As a method of bonding the edges, a thermal fusion method or an ultrasonic fusion method may be used, but example embodiments are not limited thereto. For example, the edges of the upper and lower case 110a and 110b may be bonded to each other using an adhesive.

Hereinafter, the bonded edge portion of the case 110 will be referred to as a sealing portion 115.

The sealing portion 115 may be provided in the form of a flange extending outwardly of the accommodation space 113. Therefore, the sealing portion 115 may be disposed along a periphery of the accommodation space 113.

In the present embodiment, the sealing portion 115 may be divided into a first sealing portion 115a, in which the electrode lead 120 is disposed, and a second sealing portion 115b in which the electrode lead 120 is not disposed.

The electrode lead 120 may include an anode lead 120a and a cathode lead 120b. The positive lead 120a and the negative lead 120b may protrude from opposite side surfaces of the battery case 110, and may each be connected to the electrode assembly 130.

The positive and negative leads 120a and 120b may be formed of a metal having a thin plate shape. For example, the anode lead 120a may be formed of an aluminum (Al) material, and the cathode lead 120b may be formed of a copper (Cu) material. However, the present disclosure is not limited thereto.

In the present embodiment, the positive lead 120a and the negative lead 120b may be disposed in opposing directions. However, the configuration of the present disclosure is not limited thereto, and various modifications may be made as needed. For example, the positive lead 120a and the negative lead 120b may be disposed in the same direction.

A plurality of battery cells 100 may be connected to each other to be provided in the form of a battery module. For example, a cell stack, in which a plurality of battery cells 100 are stacked, may be disposed in a housing of a battery module to be used as a battery module unit.

Also, the battery cell 100 may include at least one connection unit 10.

The connection unit 10 may be coupled to the battery case 110 of a battery cell 100, and may be disposed side by side with the sealing portion 115 in a position adjacent to the sealing portion 115.

Figure 3:
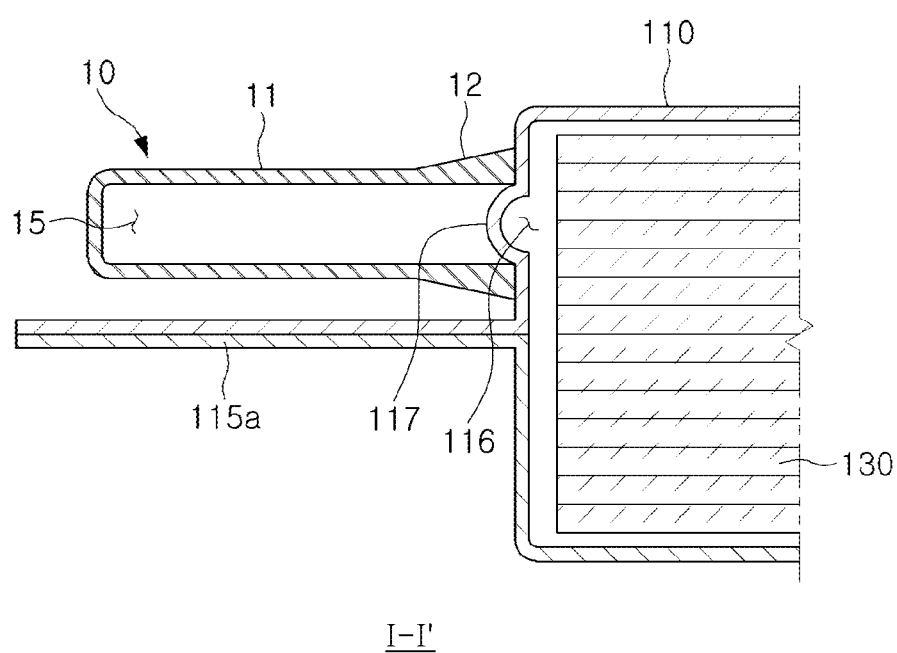
FIG. 3 is a cross-sectional view taken along line I-I' of FIG. 1.
Figure 4:
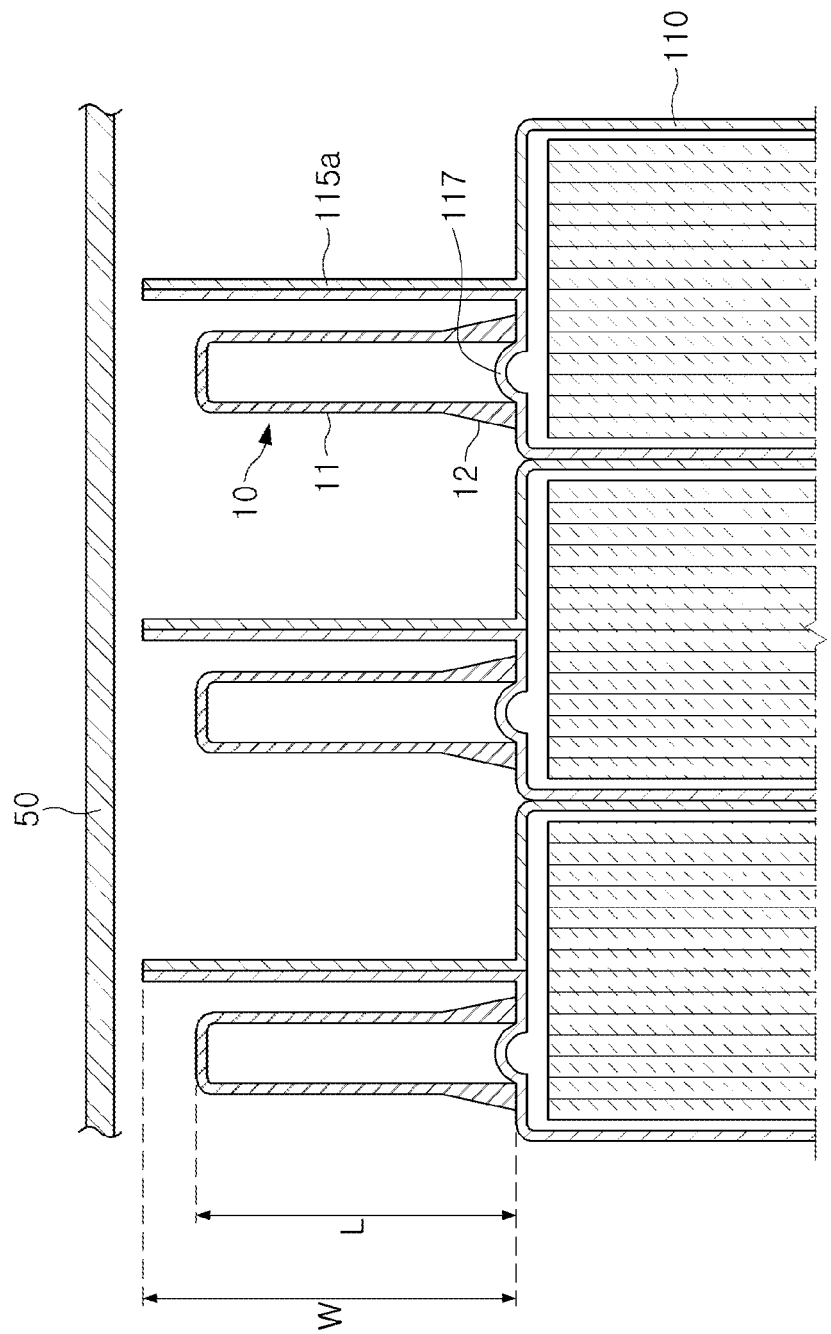
FIG. 4 is a cross-sectional view of a battery module in which the battery cell, illustrated in FIG. 3, is stacked in plural.

FIG. 3 is a cross-sectional view taken along line I-I' of FIG. 1, and FIG. 4 is a cross-sectional view of a battery module in which the battery cell, illustrated in FIG. 3, is stacked in plural.

Referring to FIGS. 3 to 4, the connection unit 10 in the present embodiment may include a body portion 11 and a coupling portion 12.

The body portion 11 may be formed to have a pipe shape and may have one end, on which the coupling portion 12 is disposed, and the other end that is opposite to the one end closed.

The coupling portion 12 may be a portion disposed on an end of the body portion 11. The coupling portion 12 may be bonded to the case 110. The coupling portion 12 may be sized to accommodate a projection 117 as described later in more detail.

In the present embodiment, the coupling portion 12 may have a cross-sectional area larger than that of the body portion 11.

For example, the coupling portion 12 may be formed to have an external diameter greater than that of the body portion 11. In addition, a thickness between the external diameter and an internal diameter of the coupling portion 12 may be greater than that of the body portion 11.

Accordingly, when the body portion 11 is bonded to the case 110, a larger bonding area may be provided to improve bonding reliability.

In the present embodiment, the coupling portion 12 may be formed to have a cross-sectional area increased in a direction toward one end thereof. Accordingly, an external surface of the coupling portion 12 may be formed to have an inclined shape increasing toward the open end of the coupling portion 12 which is coupled to the case 110. However, example embodiments are not limited thereto, and various modifications may be made. For example, the coupling portion 12 may be configured such that a cross-sectional area thereof is increased by a step structure.

Alternatively, the coupling portion 12 may be formed to have the same external diameter as the body portion 11. In this case, the coupling portion 12 may be formed to have an internal diameter smaller than an internal diameter of the body portion 11.

The connection unit 10 may be coupled to a portion, adjacent to the sealing portion 115, of the case 110. For example, the connection unit 10 may be disposed on a side surface of the case 110, forming a thickness of the battery cell 100. The side surface of the case 110 refers to the surface on which the sealing portion 115 is formed, and the sealing portion 115 may be disposed in a center of the battery cell 100 in a thickness direction. Accordingly, the connection unit 10 may be formed to have a maximum external diameter of less than half of the thickness of the battery cell 100. The maximum external diameter of the connection unit 10 refers to the maximum external diameter of the coupling portion 12.

For example, the connection unit 10 may have a maximum external diameter of 7 mm or less or 5 mm or less, but example embodiments are not limited thereto. For example, as illustrated in FIG. 3, the connection unit 10 is disposed on one side surface of the case 110 above or below the sealing portion 115 which protrudes outwardly from a center line of the side surface of the case 110. Therefore, the connection unit 10 may be implemented such that the maximum thickness thereof is less than half of the thickness of the battery cell 100 because the sealing portion 115 takes some of the area of the side surface of the case 110.

In the present embodiment, the entire connection unit 10 may be disposed within a range of thickness of the battery cell 100. Accordingly, the connection unit 10 may not be disposed to protrude outside the range of thickness of the battery cell 100. Therefore, as illustrated in FIG. 4, even when a plurality of battery cells 100 are stacked, interference between the connection units 10 or the battery cells 100 may be prevented.

In the sealing portion 115 of the battery 100, the second sealing portion 115b, in which the electrode lead 120 is not disposed, may be disposed within the housing of the battery module while being folded at least once to reduce a volume of the battery cell 100.

Accordingly, when the connection unit 10 is disposed on a side of the second sealing portion 115b, interference with the housing of the battery module may occur.

Therefore, in the present embodiment, the connection unit 10 may be disposed in a position facing the first sealing portion 115a on which the electrode lead 120 is disposed. In the illustrated embodiment the case 110 has a prismatic or box shape having a bottom surface, an opposite top surface, and a side surface connecting the top and bottom surfaces of the case 110. The sealing portion 115 is formed on the side surface of the case 110. The side surface includes a pair of opposite short side surfaces which include the positive and negative electrode leads 120a and 120b respectively, and a pair of opposite long side surfaces which do not include any electrode leads 120. The positive and negative electrode leads 120a and 120b are disposed on the short side surfaces of the case 110, respectively.

In addition, in the present embodiment, the connecting unit 10 is formed to have a length L that is smaller than the width W of the first sealing portion 115a. See FIG. 4. This is because if the connection unit 10 has a length L greater than a width W of the first sealing portion 115a, interference with the housing or internal components 50 (for example, a bus bar, and the like) of the battery module may occur.

The connection unit 10 may be bonded to the case 110 through thermal fusion or ultrasonic fusion. To this end, the connection unit 10 may be formed of a thermoplastic resin. However, the configuration of the present disclosure is not limited thereto, and the connection unit 10 and the case 110 may be bonded using various methods as long as the connection unit 10 and a bonding surface of the case 110 is tightly sealed. For example, the connection unit 10 and the case 110 may be bonded to each other by applying an adhesive therebetween.

In addition, in the battery cell 100 according to the present embodiment, a projection 117 may be formed on the case 110. The projection 117 may have a convex shape. The projection 117 may be formed to convexly protrude outwardly of the case 110, and may be disposed in an internal space 15 of the connection unit 10. More specifically, the projection 117 may be accommodated within the open end of the coupling portion 12 of the connection unit 10. Accordingly, the connection unit 10 may accommodate the projection 117 therein and may be bonded to the case 110.

The projection 117 may be formed to have a size smaller than or equal to the internal diameter of the connection unit 10.

The projection 117 may be formed by forming the case 110. Accordingly, the projection 117 may be formed together during a process of forming the accommodation space 113 of the case 110.

An internal space 116 may be defined in the projection 117, and may be used as a space into which an electrolyte to be described later is injected.

An electrolyte injection apparatus (20 of FIG. 6) may be coupled to the above-configured connection unit 10 in the present embodiment.

Figure 6:
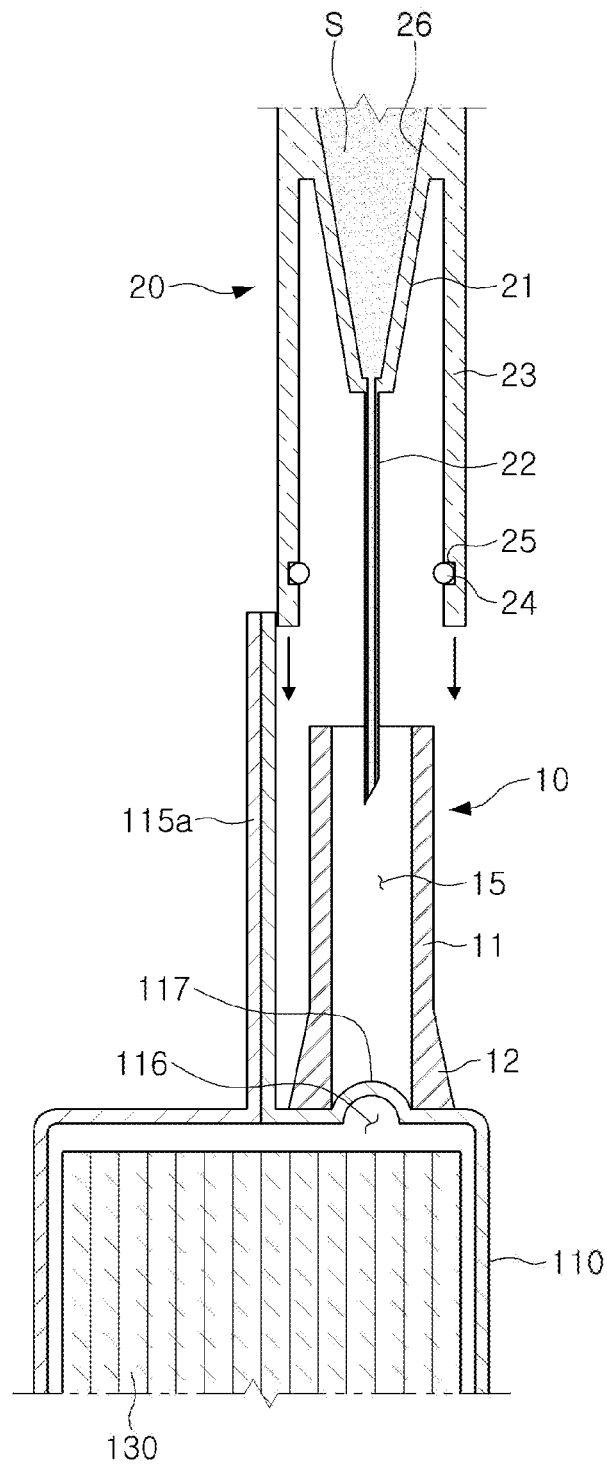
Figure 7:
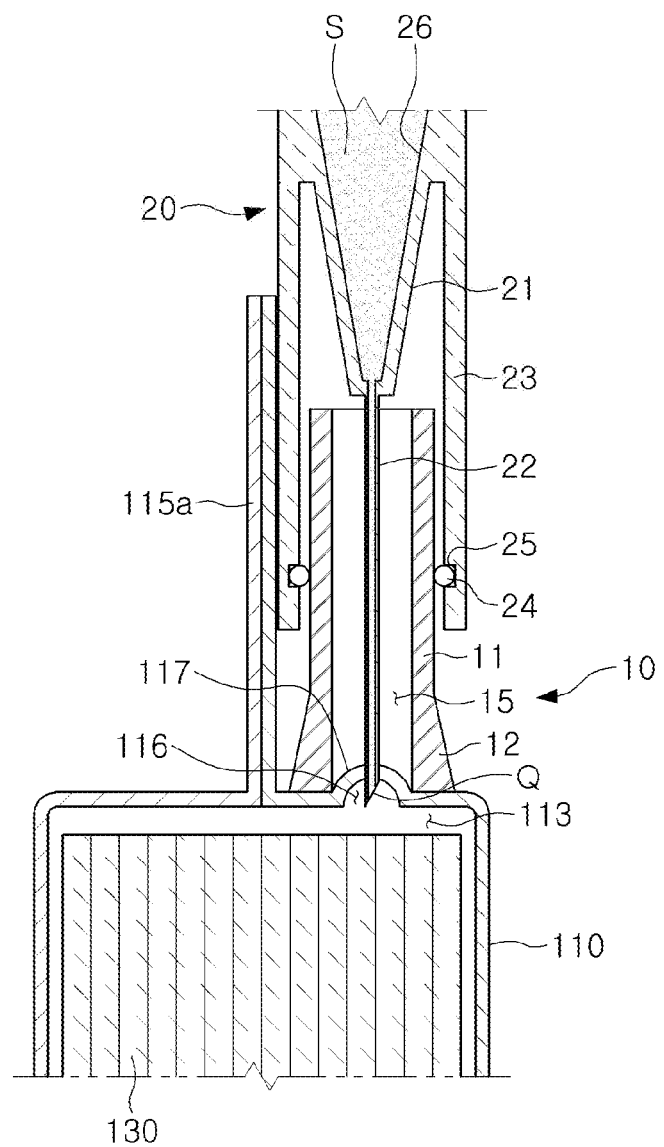

Referring to FIGS. 6 and 7, the electrolyte injection apparatus 20 may include an electrolyte containing portion 21, an injection needle 22, and a sealing cover 23.

The electrolyte containing portion 21 is a place in which an electrolyte S is temporarily contained before being injected into the battery cell 100. Therefore, the electrolyte containing portion 21 may have an internal space 26, in which the electrolyte S is contained, therein.

The injection needle 22 may be connected to the electrolyte containing portion 21. One end of the injection needle 22 may be coupled to the electrolyte containing portion 21, so that the internal space 26 of the electrolyte containing portion 21 may be connected to an internal space of the injection needle 22.

The electrolyte S, contained in the electrolyte containing portion 21, may be supplied to an external entity through the injection needle 22. To this end, the electrolyte containing portion 21 may include a pump or a pusher for pressing the electrolyte toward the injection needle 22.

The injection needle 22 may be provided in the form of a general injection needle having a sharp end portion.

As illustrated in FIG. 7, when the electrolyte injection apparatus 20 is coupled to the connection unit 10, the end portion of the injection needle 22 may penetrate through the projection 117 to be disposed in the internal space 116 of the projection 117. Accordingly, the end portion of the injection needle 22 may have a diameter smaller than that of the projection 117. In addition, when the end portion of the injection needle 22 is disposed to be inserted into the projection 117, the entire opening or hole Q of the end portion of the injection needle 22 may be disposed in the internal space 116 of the projection 117.

The sealing cover 23 may extend from the electrolyte containing portion 21, and may be provided in the form of a hollow tube. The sealing cover 23 may accommodate the injection needle 22 therein, and may be provided in the form of a cylinder concentric with respect to the injection needle 22.

An end portion of the sealing cover 23 may be formed to have an opening shape, and internal diameter of the sealing cover 23 may be greater than an external diameter of the body portion 11 of the connection unit 10. Accordingly, the body portion 11 of the connection unit 10 may be inserted into the sealing cover 23 through the opening of the sealing cover 23.

A sealing member 24 may be disposed between the sealing cover 23 and the connection unit 10 to seal a gap between the sealing cover 23 and the connection unit 10.

The sealing member 24 may be provided in the form of an O-ring along an internal circumferential surface of the sealing cover 23.

To this end, the internal circumferential surface of the sealing cover 23 may be provided with an insertion groove 25 into which the sealing member 24 is inserted, and a portion of an external diameter side of the sealing member 24 may be inserted into the insertion groove 25.

The sealing member 24 may be formed of an elastic material such as rubber or silicone, but example embodiments are not limited thereto. The sealing member 24 may be formed of various materials as long as it seals the gap between the sealing cover 23 and the connection unit 10. The insertion groove 25 may be omitted, and the sealing member 24 may be fixedly bonded to the internal circumferential surface of the sealing cover 23 through an adhesive member such as an adhesive.

When the connection unit 10 is inserted into the sealing cover 23, the sealing member 24 may be pressed by the connection unit 10 and the sealing cover 23. Accordingly, the sealing member 24 may be elastically deformed, and the gap between the sealing cover 23 and the connection unit 10 may be tightly blocked by the sealing member 24.

An arrangement structure of the sealing member 24 is not limited to the above-described configuration, and may be modified in various forms as needed. For example, the sealing member 24 may be fixedly disposed on the external circumferential surface of the connection unit 10, rather than an internal surface of the sealing cover 23. In addition, a plurality of sealing members 24 may be arranged side by side to be spaced apart from each other by a predetermined distance.

In the electrolyte injection apparatus 20 according to the present embodiment, the injection needle 22 may protrude further than the sealing cover 23. Accordingly, when the electrolyte injection apparatus 20 is coupled to the connection unit 10, the injection needle 22 may be inserted into the connection unit 10, and the connection unit 10 may then be inserted into the sealing cover 23.

Next, a process of injecting an electrolyte into a battery cell using an electrolyte injection apparatus will be described.

FIGS. 5 to 8 are diagrams illustrating a process of injecting an electrolyte into a battery cell using an electrolyte injection apparatus according to the present embodiment.

Figure 5:
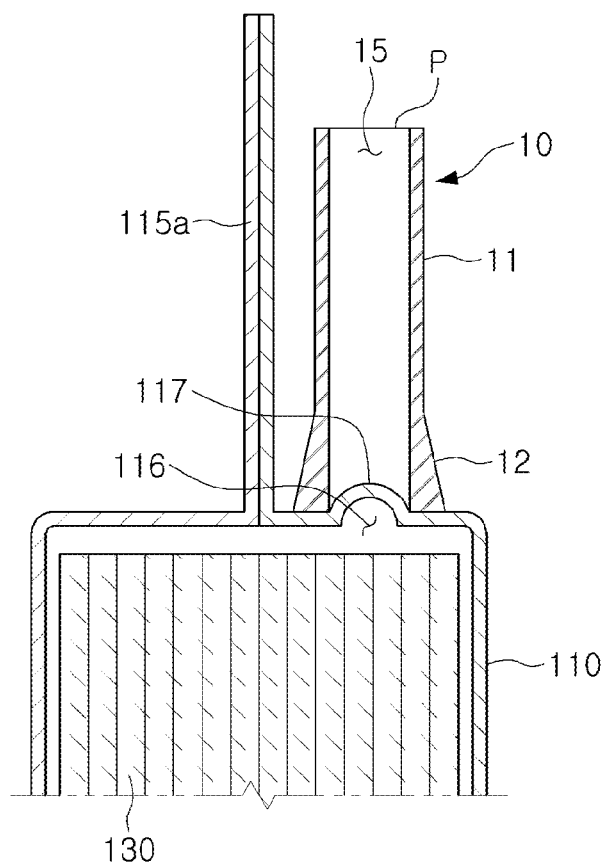
FIGS. 5 to 8 are diagrams illustrating a process of injecting an electrolyte into a battery cell using an electrolyte injection apparatus according to an embodiment of the present disclosure.

As illustrated in FIG. 5, an opening P may be formed in the other end of the connection unit 10 that is opposite to the end that is bonded to the case 110. To this end, a portion of the other end of the connection unit 10 may be removed in the operation of forming the opening.

In this case, a non-removed remaining portion of the connection unit 10 may have a length less than or equal to that of the injection needle 22.

Then, the electrolyte injection apparatus 20 may be coupled to the connection unit 10. This may be implemented by inserting the injection needle 22 of the electrolyte injection apparatus 20 into the internal space 15 of the connection unit 10 as illustrated in FIG. 6 and then inserting the connection unit 10 into the sealing cover 23 as illustrated in FIG. 7.

When the electrolyte injection apparatus 20 is coupled to the connection unit 10, an end of the injection needle 22 may penetrate through the projection 117 to be disposed in the internal space 116 of the projection 117. An entire hole Q of the end of the injection needle 22 may also be only disposed in the internal space 116 of the projection 117 and may not protrude toward the accommodation space 113.

On the other hand, when the injection needle 22 is excessively inserted into the case 110, the injection needle 22 may be brought into contact with the electrode assembly 130. In this case, a fault such as short-circuit may occur.

Figure 10:
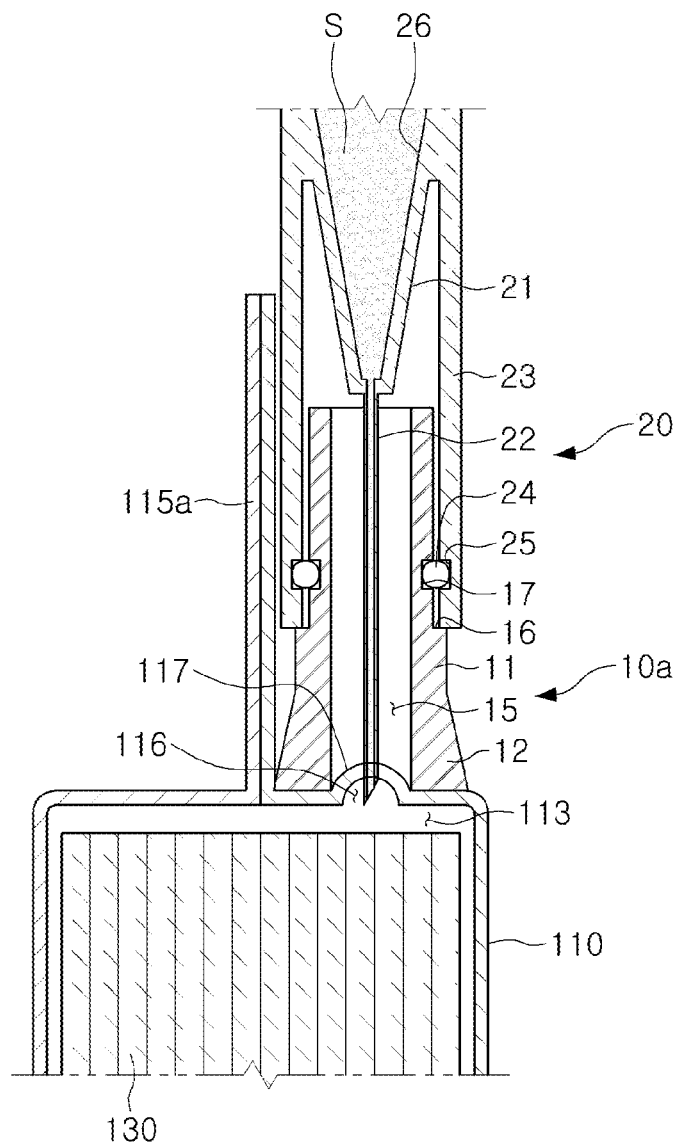

Accordingly, in order to solve such a problem, the present invention may include the configuration shown in FIG. 10. In this case, the injection needle 22 may not protrude toward the accommodation space 113, and the end thereof may be disposed only in the projection 117.

Then, an electrolyte S may be injected into the battery cell 100 through the electrolyte injection apparatus 20. When the electrolyte S contained in the electrolyte containing portion 21 is pressed toward the injection needle 22 through the above-mentioned pump or pusher, the electrolyte S may be injected into the battery cell 100 through the injection needle 22.

Figure 8:
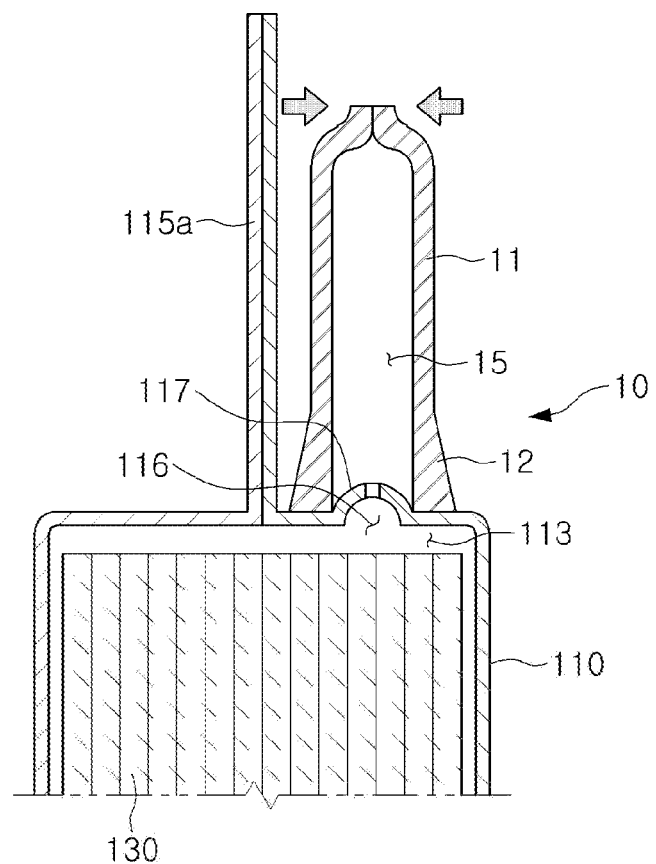

When replenishment of the electrolyte S is finished, the electrolyte injection apparatus 20 may be removed from the connection unit 10. As illustrated in FIG. 8, the opening P formed in the other end of the connection unit 10 may be sealed to prevent the electrolyte S from leaking through the connection unit 10.

A method such as thermal fusion or ultrasonic fusion may be used to seal the connection unit 10. However, example embodiments are not limited thereto, and various modifications may be made. For example, the opening of the connection unit 10 may be filled with a separate sealing material such as a resin (for example, a thermoplastic resin) to seal the connection unit 10.

Since the above-described battery cell 100 according to the present embodiment includes the connection unit 10 but an opening, or the like, is not formed in the case 110 of the battery cell 100 in advance, initial stability of the battery cell 100 may be maintained before replenishing an electrolyte.

In addition, accidents such as explosion caused by gas expansion may be prevented. In addition, since the electrolyte of the battery cell may be replenished, a replacement cycle of the battery cell may be extended to enhance economic efficiency.

Unlike the present embodiment, the case in which a connection unit is configured in the form of a valve may be taken into account. In this case, the valve should be installed to penetrate through the case 110 or to be inserted into the sealing portion 115. Accordingly, there is a high probability that the valve and the bonding surface of the case 110 are peeled off, so that the stability of the battery cell may be deteriorated.

Meanwhile, in the battery cell 100 according to the present embodiment, the connection unit 10 is not installed to penetrate through the case 110, so that the stability of the battery cell 100 may be improved.

In addition, the connection unit 10 may be disposed in a position adjacent to the sealing portion 115, so that even when a plurality of battery cells 100 are stacked, interference between the battery cells 100 may be prevented from occurring due to the connection units 10. Accordingly, the battery cell 100 may be easily applied to a battery module according to the related art without changing an internal structure of the battery cell 100.

On the other hand, the electrolyte injection apparatus according to the present embodiment may be utilized even when gas inside the battery cell 100 is discharged to an external entity. This may be implemented in a manner of suctioning the gas inside the battery cell 100, rather than injecting an electrolyte in the state illustrated in FIG. 7.

As described above, the electrolyte injection apparatus according to the present disclosure may be utilized in various forms.

The configuration of the present disclosure is not limited to the above-described embodiment, and various modifications may be made.

Figure 9:
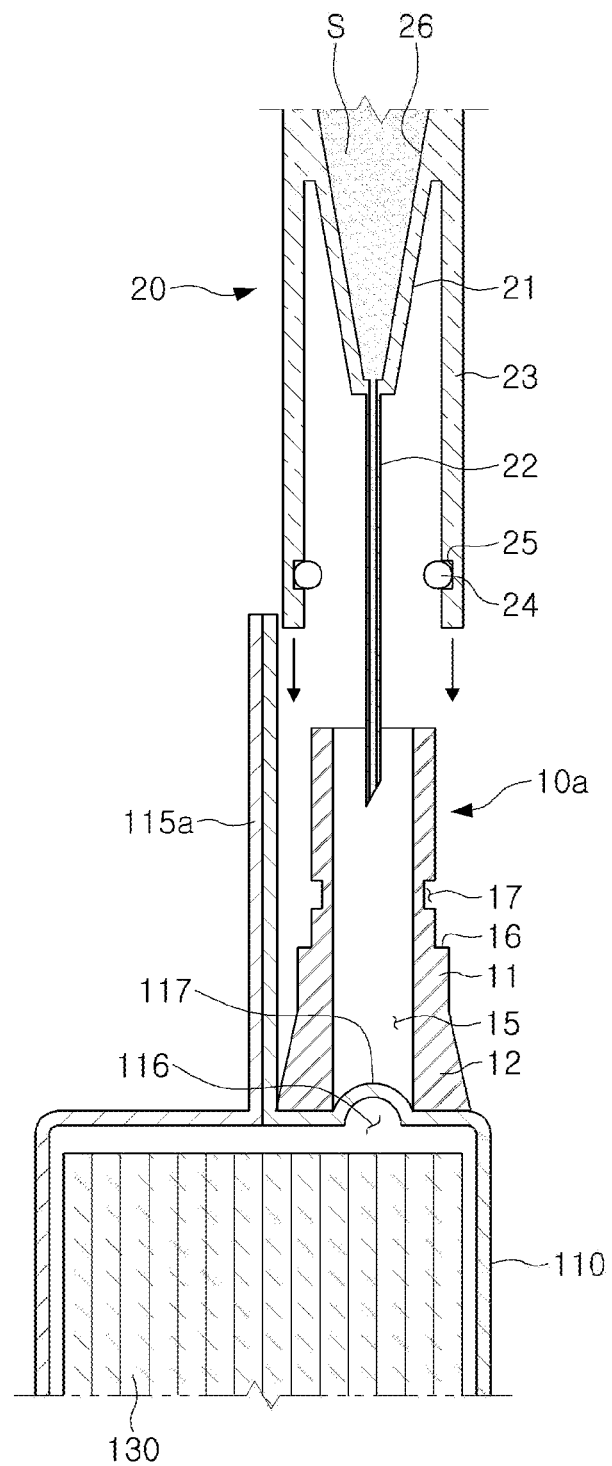
FIGS. 9 and 10 are schematic diagrams illustrating a connection unit and an electrolyte injection apparatus according to another example embodiment of the present disclosure.

FIGS. 9 and 10 are schematic diagrams illustrating a connection unit and an electrolyte injection apparatus according to another example embodiment, and illustrate operations corresponding to FIGS. 6 and 7.

Referring to FIGS. 9 and 10, in a battery cell according to the present embodiment, an insertion blocking portion 16 may be provided on a body portion 11 of a connection unit 10*a*.

The insertion blocking portion 16 may be provided to limit a depth to which an electrolyte injection apparatus 20 is coupled to the connection unit 10*a*. Therefore, the insertion blocking portion 16 may be provided in various forms as long as it blocks insertion of the electrolyte injection apparatus 20.

In the present embodiment, the insertion blocking portion 16 may be formed to have a staircase-shaped step. Accordingly, the body portion 11 may be formed to have a diameter varying based on the insertion blocking portion 16. In addition, the sealing cover 23 may be formed to have an internal diameter smaller than a diameter of the body portion 11 increased through the insertion blocking portion 16.

When the electrolyte injection apparatus 20 is coupled to the connection unit 10a to be brought into contact with the insertion blocking portion 16, an end of an injection needle 22 of the electrolyte injection apparatus 20 may penetrate through a projection 117, and thus, the injection needle 22 may be disposed in an internal space 116 of the projection 117. Accordingly, a position of the insertion blocking portion 16 may be defined to correspond to a difference in distance between an end portion of a sealing cover 23 and an end portion of the injection needle 22.

A shape of the insertion blocking portion 16 is not limited to the above-described embodiment and may be modified into various shapes. Various modifications may be made as long as the insertion blocking portion 16 defines a coupling position of the sealing cover 23 and the connecting unit 10a. For example, the insertion blocking portion 16 may be formed as a projection protruding from an external circumferential surface of a body portion 11. The projection protruding from an external circumferential surface of a body portion 11 may be referred to as a projection shape.

In addition, the connection unit 10a in the present embodiment may be provided with a locking groove 17 in the external circumferential surface.

A sealing member 24 may be inserted into the locking groove 17. Accordingly, the locking groove 17 may be disposed in a region, facing an internal circumferential surface of the sealing cover 23, of the external circumferential surface of the connection unit 10a when the sealing cover 23 is coupled to the connection unit 10a.

In the present embodiment, the locking groove 17 may be provided to inhibit the electrolyte injection apparatus 20 from being easily removed from the connection unit 10a. Accordingly, the locking groove 17 may be formed in a position into which the sealing member 24 may be inserted when the sealing cover 23 is completely coupled to the connection unit 10a.

In the present embodiment, a description has been provided for the case in which the sealing member 24 is inserted into the locking groove 17. However, the configuration of the present disclosure is not limited thereto, and a separate projection is provided on an internal circumferential surface of the sealing cover 23 to be inserted into the locking groove 17. In addition, various modifications may be made. For example, the sealing cover 23 and the connection unit 10a may be configured to be coupled to each other by a coupling structure such as a Bayonet Neill-Concelman (BNC) connector.

Figure 11:
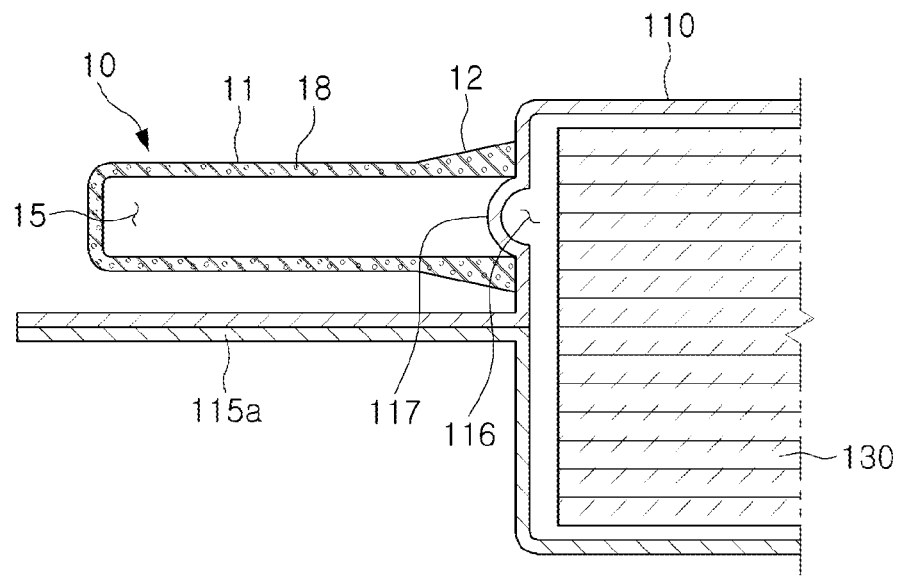
FIG. 11 is a cross-sectional view of a battery cell according to another example embodiment of the present disclosure.

FIG. 11 is a cross-sectional view of a battery cell according to another example embodiment of the present disclosure.

Referring to FIG. 11, in a battery cell in the present embodiment, a connection unit 10 may be formed of a thermoplastic resin containing inorganic particles 18.

The inorganic particles 18 may be contained in the connection unit 10 to significantly reduce gas permeability of the connection unit 10. Thus, an internal space 15 of the connection unit 10 may be more tightly sealed.

In the present embodiment, as the inorganic particles 18 may include, for example, one of alumina ($Al_2O_3$), silicon oxide ($SiO_2$), and zirconia ($ZrO_2$), but examples of the inorganic particles 18 are not limited thereto. As described above, various materials may be used as long as gas permeability is reduced or completely prevented. In other words, in an embodiment, the connection unit 10 may be made of a material that is impermeable to possible gases generated.

In addition, in the present embodiment, the inorganic particles 18 may be contained in the connection unit 10 in a ratio of 10 to 70 wt %. However, example embodiments are not limited thereto.

Figure 12:
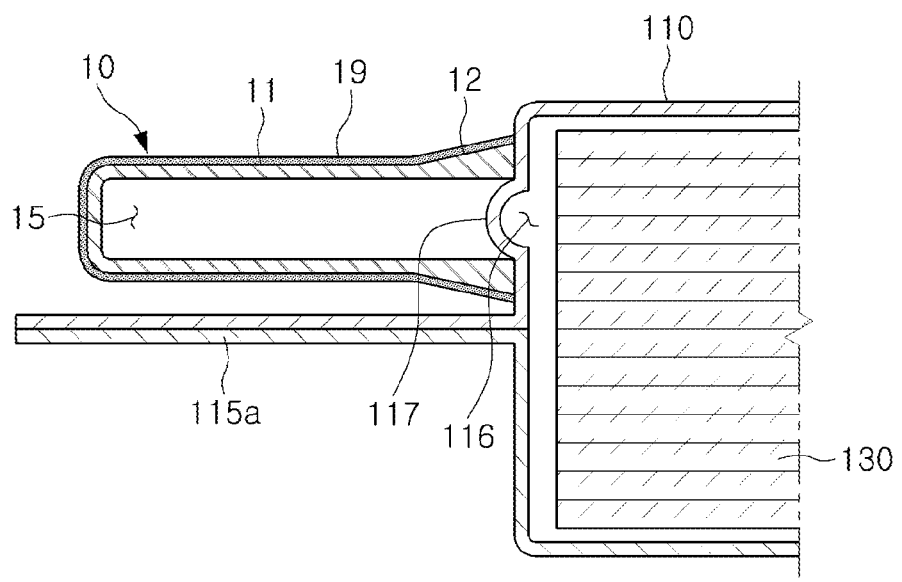
FIG. 12 is a cross-sectional view of a battery cell according to another example embodiment of the present disclosure.

FIG. 12 is a cross-sectional view of a battery cell according to another example embodiment of the present disclosure.

Referring to FIG. 12, in a battery cell in the present embodiment, a gas barrier layer 19 may be disposed on the external surface of the connection unit 10.

The gas barrier 19 may be provided to block permeation of gas. The gas barrier layer 19 may be formed by coating a film, through which gas cannot permeate or is difficult to permeate, on the external surface of the connection unit 10. Accordingly, an internal space 15 of the connection unit 10 may be more tightly sealed.

As the gas barrier layer 19, polyvinylidene chloride (PVDC), ethylene vinyl alcohol (EVOH), polyethylene (PE), or the like, may be used. However, examples of the gas barrier 19 are not limited thereto, and any film may be used as the gas barrier 19 as long as it is capable for blocking gas permeation.

In the present embodiment, a description has been provided for the case in which the gas barrier layer 19 is formed only on the external surface of the connection unit 10. However, various modifications may be made as needed. For example, the gas barrier 19 may be formed only on the internal surface of the connection unit 10 or on both the external and internal surfaces of the connection unit 10. The external and internal surfaces of the connection unit 10 together are also referred to as the entire surface of the connection unit 10.

As described above, a battery cell may be provided with a connection unit 10 to discharge gas generated therein. Thus, accidents such as an explosion caused by gas expansion may be prevented. In addition, since an electrolyte of the battery cell may be replenished, a replacement cycle of the battery cell may be extended to enhance economic efficiency.

Moreover, since, according to the present invention, an opening, or the like, is not formed in the case of the battery cell in advance an initial stability of the battery cell may be maintained before replenishing an electrolyte or discharging gas.

While embodiments have been shown and described above, it will be apparent to those skilled in the art that modifications and variations could be made without departing from the scope of the present disclosure as defined by the appended claims.

What is claimed is:

1. A battery cell, formed as a pouch-type battery cell, comprising:
    a case including an accommodation space accommodating an electrode assembly therein and a sealing portion disposed along a periphery of the accommodation space where an upper case and a lower case are in contact with each other to seal the accommodation space; and
    a connection unit formed to have a tubular shape and having one end bonded to an external surface of the case,
    wherein the case includes a projection formed to protrude outwardly,
    wherein the projection is disposed in an internal surface of the connection unit,
    wherein an internal space of the projection is disposed outwardly from an internal space of the case, wherein the connection unit is spaced apart from the sealing portion, and a length of the connection unit in a first direction is less than the width of the sealing portion in the first direction, the first direction being a direction in which the sealing portion extends from the case, wherein the sealing portion extends from the external surface of the case farther than the connection unit, and wherein the connection unit is disposed side by side with the sealing portion in a position adjacent to the sealing portion.

2. The battery cell of claim 1, wherein the connection unit comprises:
 a body portion; and
 a coupling portion disposed on an end portion of the body portion, bonded to the case, and accommodating the projection therein.

3. The battery cell of claim 2, wherein the coupling portion is formed to have an external diameter greater than or equal to an external diameter of the body portion.

4. The battery cell of claim 3,
 wherein the connection unit includes an insertion blocking portion formed on the body portion of the connection unit for limiting a depth to which an injection needle is inserted.

5. The battery cell of claim 4, wherein the insertion blocking portion is formed to have a step or projection shape.

6. The battery cell of claim 1, wherein the connection unit is disposed within a range of thickness of the case.

7. The battery cell of claim 1, wherein the connection unit is bonded to the external surface of the case by thermal fusion, ultrasonic fusion, or bonding using an adhesive.

8. The battery cell of claim 1, wherein the connection unit is formed of a thermoplastic resin.

9. The battery cell of claim 8, wherein the connection unit contains inorganic particles.

10. The battery cell of claim 8, wherein a gas barrier is disposed on a surface of the connection unit.

11. An electrolyte injection apparatus coupled to a connection unit, formed to have a tubular shape and having one end receiving a projection, formed to protrude from an external surface of a case of a pouch-type battery cell, and bonded to the case, to supply an electrolyte to an inside of the pouch-type battery cell, wherein an internal space of the projection is disposed outwardly from an internal space of the case, wherein the case includes an accommodation space accommodating an electrode assembly therein and a sealing portion disposed along a periphery of the accommodation space where an upper case and a lower case are in contact with each other to seal the accommodation space, wherein the connection unit is spaced apart from the sealing portion and is disposed side by side with the sealing portion in a position adjacent to the sealing portion, wherein a length of the connecting unit in a first direction is less than the width of the sealing portion in the first direction, the first direction being a direction in which the sealing portion extends from the case, and wherein the sealing portion extends from the external surface of the case farther than the connection unit, the electrolyte injection apparatus comprising:
 an electrolyte containing portion containing an electrolyte therein;
 an injection needle connected to the electrolyte containing portion; and
 a sealing cover formed to have a tubular shape and coupled to the electrolyte containing portion to be concentric with respect to the injection needle, wherein the connection unit is disposed to be inserted into the sealing cover when the electrolyte injection apparatus is coupled to the connection unit.

12. The electrolyte injection apparatus of claim 11, wherein
 a sealing member is provided on an internal circumferential surface of the sealing cover to seal a gap between the sealing cover and the connection unit.

13. The electrolyte injection apparatus of claim 12, wherein a locking groove, into which a portion of the sealing member is inserted, is formed in an external circumferential surface of the connection unit.

14. The electrolyte injection apparatus of claim 11, wherein an end of the injection needle penetrates through the projection to be disposed in the internal space of the projection when the electrolyte injection apparatus and the connection unit are completely coupled to each other.

15. The electrolyte injection apparatus of claim 14, wherein an insertion blocking portion is formed on an external circumferential surface of the connection unit to limit a depth to which the injection needle is inserted.

16. An electrolyte injection method using the electrolyte injection apparatus of claim 11, the electrolyte injection method comprising:
 forming an opening in the connection unit;
 coupling the electrolyte injection apparatus to the connection unit to insert the injection needle into the internal space of the projection;
 injecting an electrolyte into the pouch-type battery cell;
 removing the electrolyte injection apparatus from the connection unit; and
 sealing the opening of the connection unit.

17. The electrolyte injection method of claim 16, wherein the sealing of the opening comprises thermally compressing or ultrasonically fusing the opening of the connection unit to be sealed.

18. The electrolyte injection method of claim 16, wherein the sealing of the opening comprises filling the opening of the connection unit with a sealing material to seal the opening.

19. A system for supplying an electrolyte to a battery cell, having an electrode assembly enclosed inside a case, the system comprising:
 a pouch-type battery cell having an electrode assembly enclosed inside a case, the case including an accommodation space accommodating an electrode assembly therein, a sealing portion disposed along a periphery of the accommodation space where an upper case and a lower case are in contact with each other to seal the accommodation space, and a convex projection protruding from a side surface of the case, an internal space of the convex projection disposed outwardly from an internal space of the case;
 a connection unit having a first end bonded to the side surface of the case around the convex projection extending inside a space of the connection unit; and
 an electrolyte injection apparatus comprising:
 an electrolyte containing portion containing an electrolyte therein;
 an injection needle fluidly connected to the electrolyte containing portion; and
 a sealing cover formed to have a tubular shape and coupled to the electrolyte containing portion to be concentric with respect to the injection needle, wherein the connection unit is spaced apart from the sealing portion and is disposed side by side with the sealing portion in a position adjacent to the sealing portion, wherein a length of the connecting unit in a first direction is less than the width of the sealing portion in the first direction, the first direction being a direction in which the sealing portion extends from the case, wherein the sealing portion extends from the side surface of the case farther than the connection unit, wherein the connection unit is formed to have a tube shape and is disposed to be inserted into the sealing cover when the electrolyte injection apparatus is coupled to the connection unit, and, wherein the connection unit and the sealing cover are configured to sealingly couple to each other with the injection needle piercing through the convex projection to create a fluid path for the electrolyte from the electrolyte containing portion to be injected into an inside of the case of the pouch-type battery cell.

* * * * *